United States Patent [19]

Strubelt

[11] 4,352,340
[45] Oct. 5, 1982

[54] DISPOSABLE LITTER DEVICES

[76] Inventor: John R. Strubelt, 9025 Condor Ave., St. Louis, Mo. 63114

[21] Appl. No.: 165,503

[22] Filed: Jul. 3, 1980

[51] Int. Cl.³ ............................................. A01K 29/00
[52] U.S. Cl. ......................................... 119/1; 119/19
[58] Field of Search ...................................... 119/1, 19

[56] References Cited

U.S. PATENT DOCUMENTS

| | | | |
|---|---|---|---|
| 3,885,523 | 5/1975 | Coleman | 119/19 |
| 3,890,930 | 6/1975 | Clark | 119/1 |
| 3,982,500 | 9/1976 | Marlatt | 119/19 |
| 4,111,157 | 9/1978 | Haugen | 119/1 |

FOREIGN PATENT DOCUMENTS 3093  7/1979  European Pat. Off. ............... 119/1

Primary Examiner—Jay N. Eskovitz
Attorney, Agent, or Firm—Joseph A. Fenlon

[57] ABSTRACT

An animal litter device which includes a shell having a removable lid and an access aperture in the side of the shell, a disposable bag disposed in the shell and held in place within the shell by the lid, a ring secured to the bag in the vicinity of the aperture and having the inner portion of the bag within the ring cut away, and clips for securing the ring to the shell at the location of the aperture.

4 Claims, 6 Drawing Figures

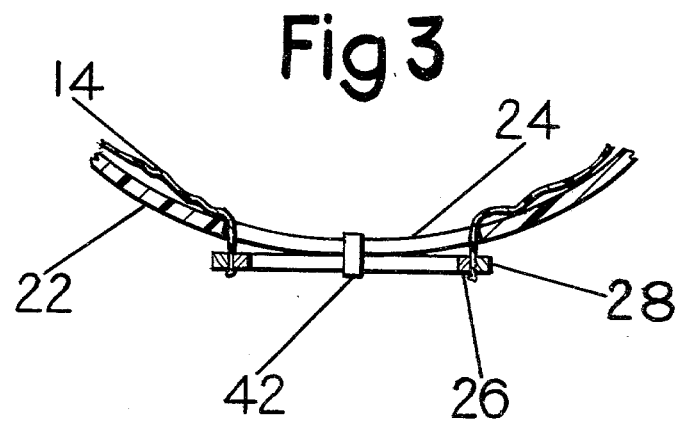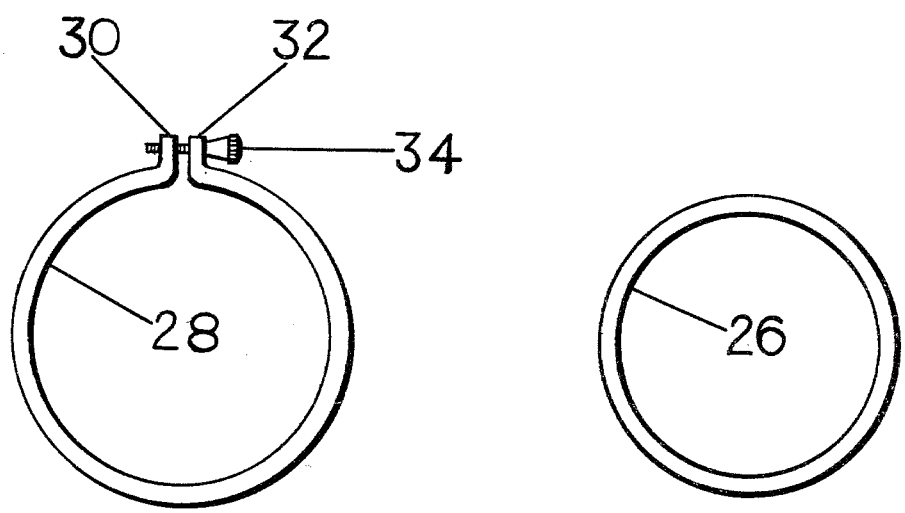

DISPOSABLE LITTER DEVICES

This invention relates to animal litter devices.

It is the object of this invention to provide an animal litter device which includes a disposable bag in which the litter absorbing material is contained and which also includes ingress and egress means for the animal to make its litter inside the bag.

With the above and other objects in view, my invention resides in the unique and novel form, construction, arrangement and combination of the various parts and elements shown in the drawings, described in the specification and claimed in the claims.

IN THE DRAWINGS

FIG. 3 is an enlarged fragmentary sectional view taken along lines 3—3 of FIG. 1.

FIG. 4 is an enlarged elevational view of the outer clamping ring.

FIG. 5 is an enlarged elevational view of the inner clamping ring.

Figure 1:
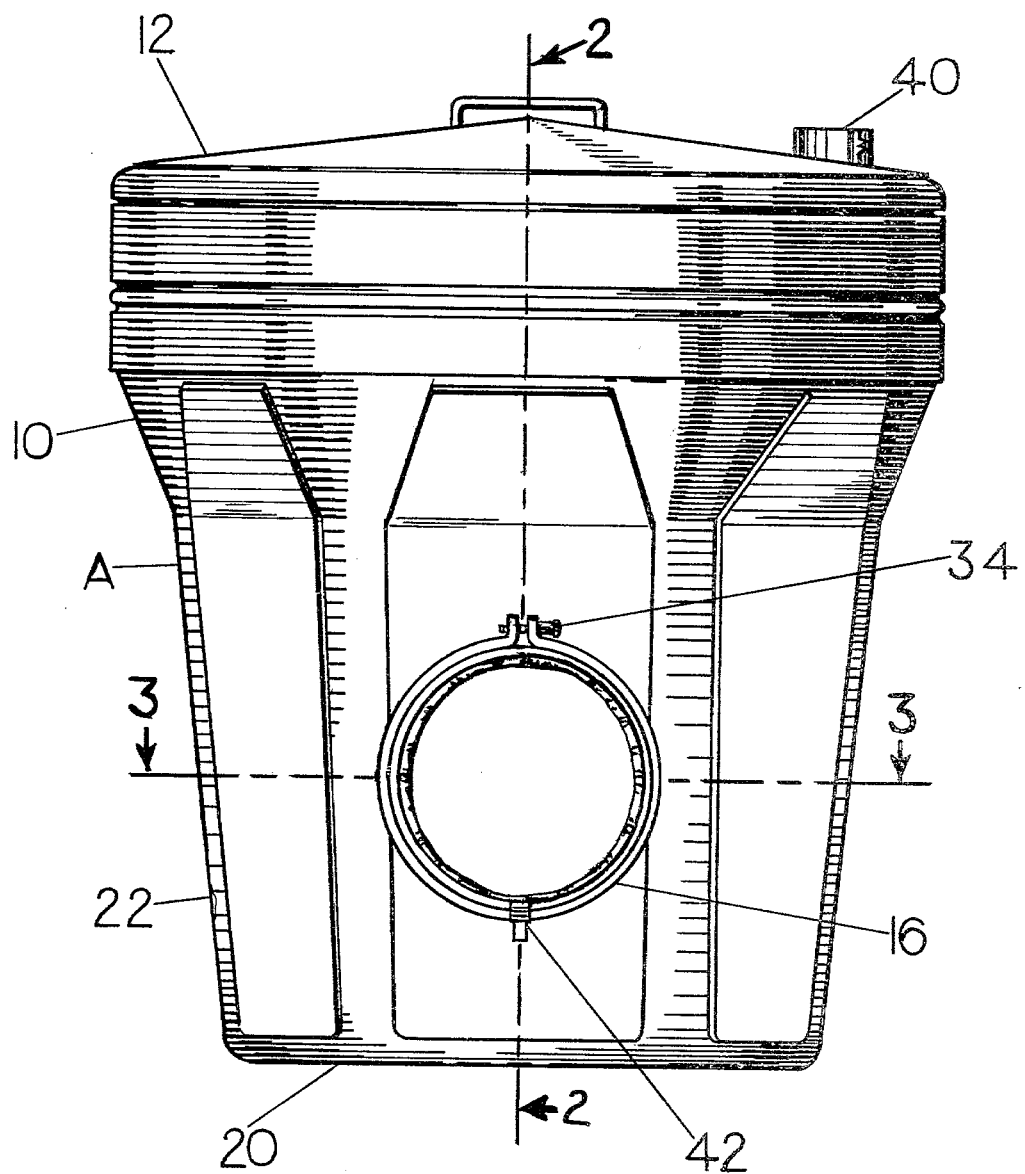
FIG. 1 is a front elevational view of a preferred embodiment of my invention.
Figure 2:
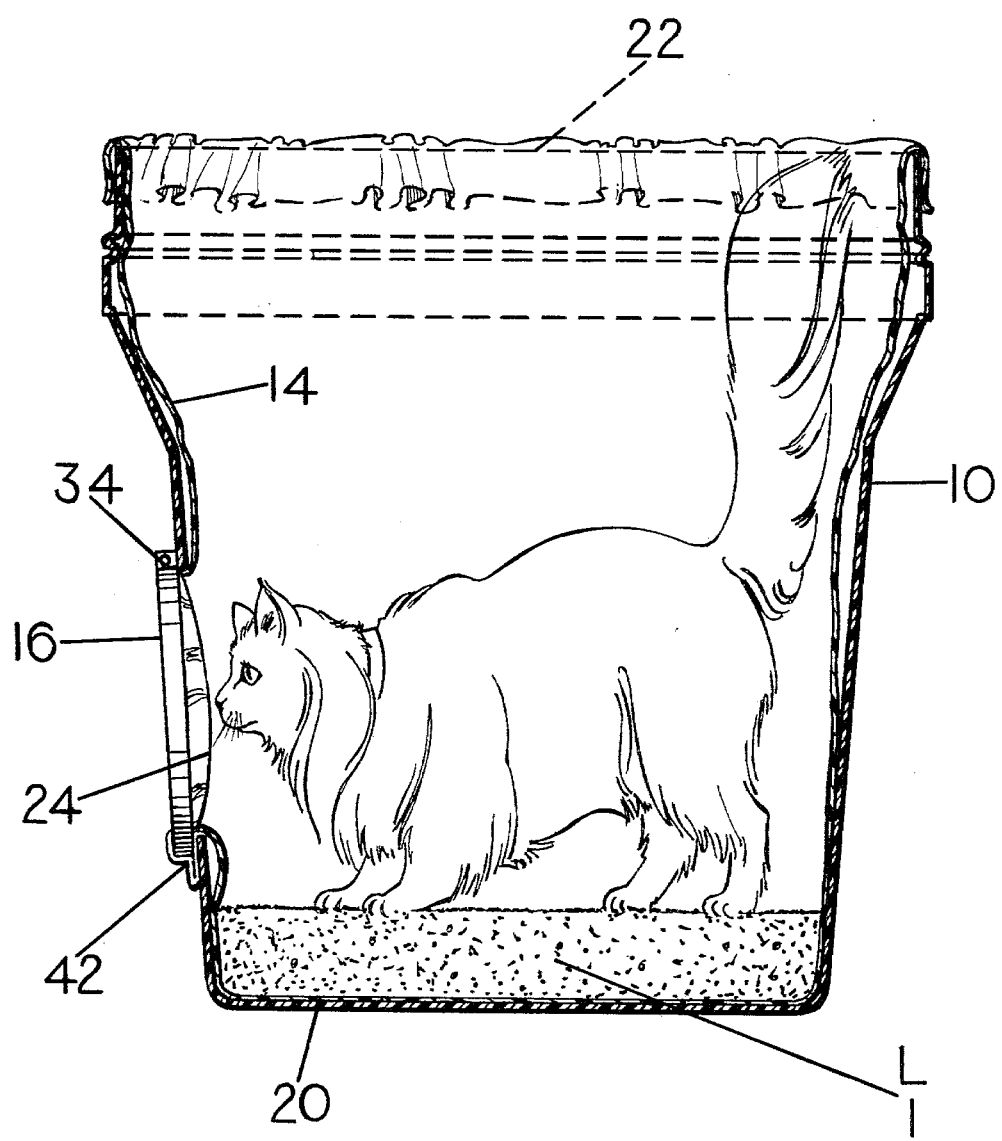
FIG. 2 is a sectional view taken along lines 2—2 of FIG. 1.

Referring now in more detail and by reference character to the drawings which illustrate a preferred embodiment of my invention, A represents a litter device comprising a shell 10, a lid 12, a bag 14, and a retaining ring 16. The shell 10 includes a flat base 20 and an annular wall 22 provided with an annular aperture 24 which is upwardly spaced from the base 20. The bag 14 is flexible and sized to open within the shell 10 and to fit snugly against the base 20 and wall 22 when fully open, and also to overlap over the top of the wall 22 sufficiently that the bag 14 is secured in place when the lid 12 is placed on the shell 10.

The retaining ring 16 includes a circular inner ring 26 and an overlapping outer ring 28 which is provided with complementary outwardly projecting flanged ears 30, 32. An adjusting screw 34 is passed through the ear 32 and threadedly inserted into ear 30 whereby the ears 30, 32 may be urged together to clamp the outer ring 28 to the inner ring 26. The lid 12 is provided with an upwardly extending vent pipe 40.

Figure 6:
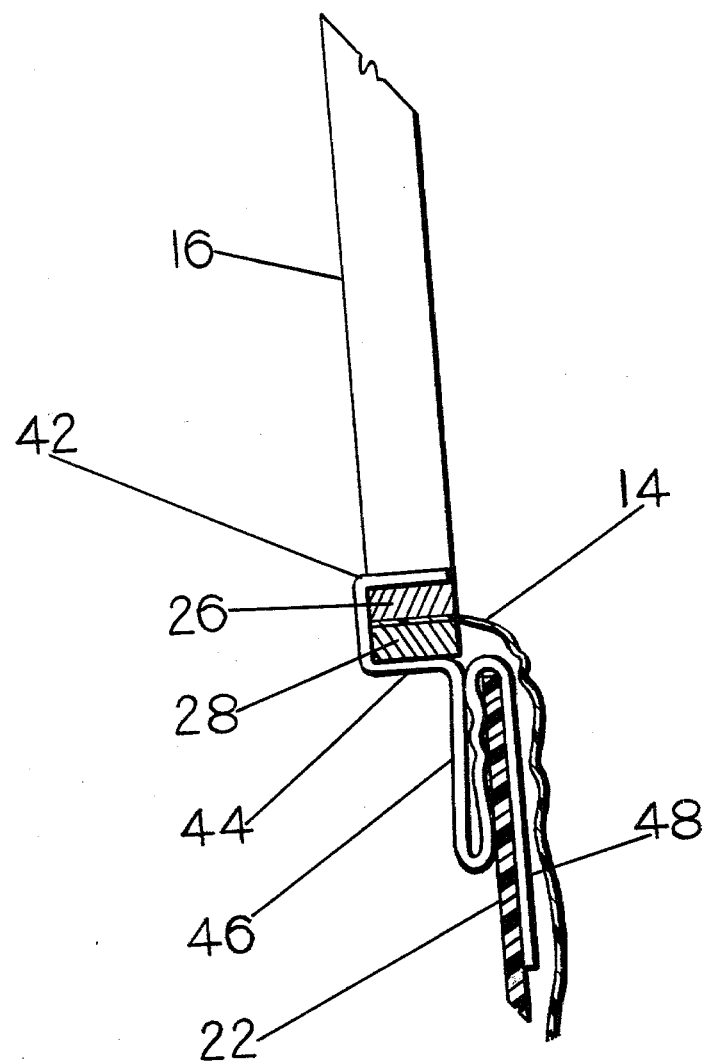
FIG. 6 is a greatly enlarged side elevational view of the clamp at the ring and shell junction.

The clip 42 is fabricated of springy material, preferably metal and includes an upper hook portion 44 sized for receiving the ring 16, a downwardly extending loop portion 46 and a downwardly extending flat face 48. Adjacent the face 48 the loop portion is rippled as seen in FIG. 6.

ASSEMBLY

At a height approximately equal to the height of the aperture 24 from the base 20, the inner ring 26 is located within the bag 14 and the outer ring 28 is clamped to the inner ring 26 from the outside of the bag 14. Thereafter that part of the bag 14 which is held in place by the retaining ring 16 is cut out. The bag 14 is then passed through the aperture 24 into the shell 10. The ring 16 is then secured to the aperture 24 by a metallic clip 42. The bag 14 is then opened in the shell 10 from the top, and litter material L is poured into the bag until the entire bottom of the bag 14 and shell 10 are covered with approximately three (3) inches of litter material L. The lid 12 is then placed on top of the shell 10 and the litter device A is ready for use.

USE

An animal desiring to use the litter device A merely steps into the shell 10 by going into the bag 14 through the ring 16 and aperture 24, and thereafter depositing its litter in the litter material L. At appropriate times, the bag is changed by removing the clip 42 from the ring 14 and the outer ring 28 from the inner ring 26 (both rings 26 and 28 were sized larger than the aperture 24 to prevent passage into the shell 10) and thereafter removing the bag 14 containing the litter and litter material from the shell 10 for disposal. New bags 14 may then be replaced in the manner previously described.

The vent 40 permits escape of gases from the shell 10 and through a hose attachment may be passed out of doors when the litter device A is used indoors.

It should be noted that the invention as shown has a shell with sufficient height to permit a male cat to have his tail fully extended upwardly when urinating which is the natural position for the male. It should also be noted that male cats naturally assume a position within the shell in which their face is presented to the access aperture whereby to concentrate their spray to the lined portion of the shell. The height feature makes this invention particularly unique in that it is the only known litter device designed for the natural instincts of the male cat.

It should be understood that changes and modifications in the various parts, combinations, and structures may be made and substituted for what is shown and claimed herein without departing from the nature and principle of my invention.

I claim:

1. An animal litter device comprising a shell and a cover, said shell including a flat base and an upwardly extending enclosing wall of substantial height, said upwardly extending wall being provided with an access aperture sized for passage of the animal therethrough, said access aperture being located in the wall intermediate the base and the upper periphery thereof,
    a disposable bag disposed in the shell covering the base and the inner faces of the wall, and extending over the upper periphery thereof,
    said lid being adapted for snug fitting engagement over the upper periphery of the shell whereby to hold the bag in place and also including a vent,
    and clamping means for securing the bag along the margins of the access aperture.

2. The device of claim 1 in which the clamping ring includes an inner ring and an open outer ring provided with threaded means for securing the outer ring securely to the inner ring while the bag is disposed between the inner and outer rings.

3. The device of claim 1 in which the shell is of sufficient height to permit an animal to extend its tail fully upwardly within the shell when standing erect.

4. An animal litter device comprising a shell having a flat base and covered on top with a lid,
    an access portal on the side of the shell intermediate the base and the lid,
    a liner bag disposed within the shell along the base and secured at the top of the shell adjacent the lid, said bag being disposed along the base and fully covering the internal walls of the shell from the base to the lid,
    means for establishing a fixed aperture in the liner bag at the access port whereby to permit animal entry simultaneously into the shell and bag at the access port,
    and means for removably securing the bag to the shell at the access port, and at the upper margins of the shell.

* * * * *